Patented Dec. 9, 1952

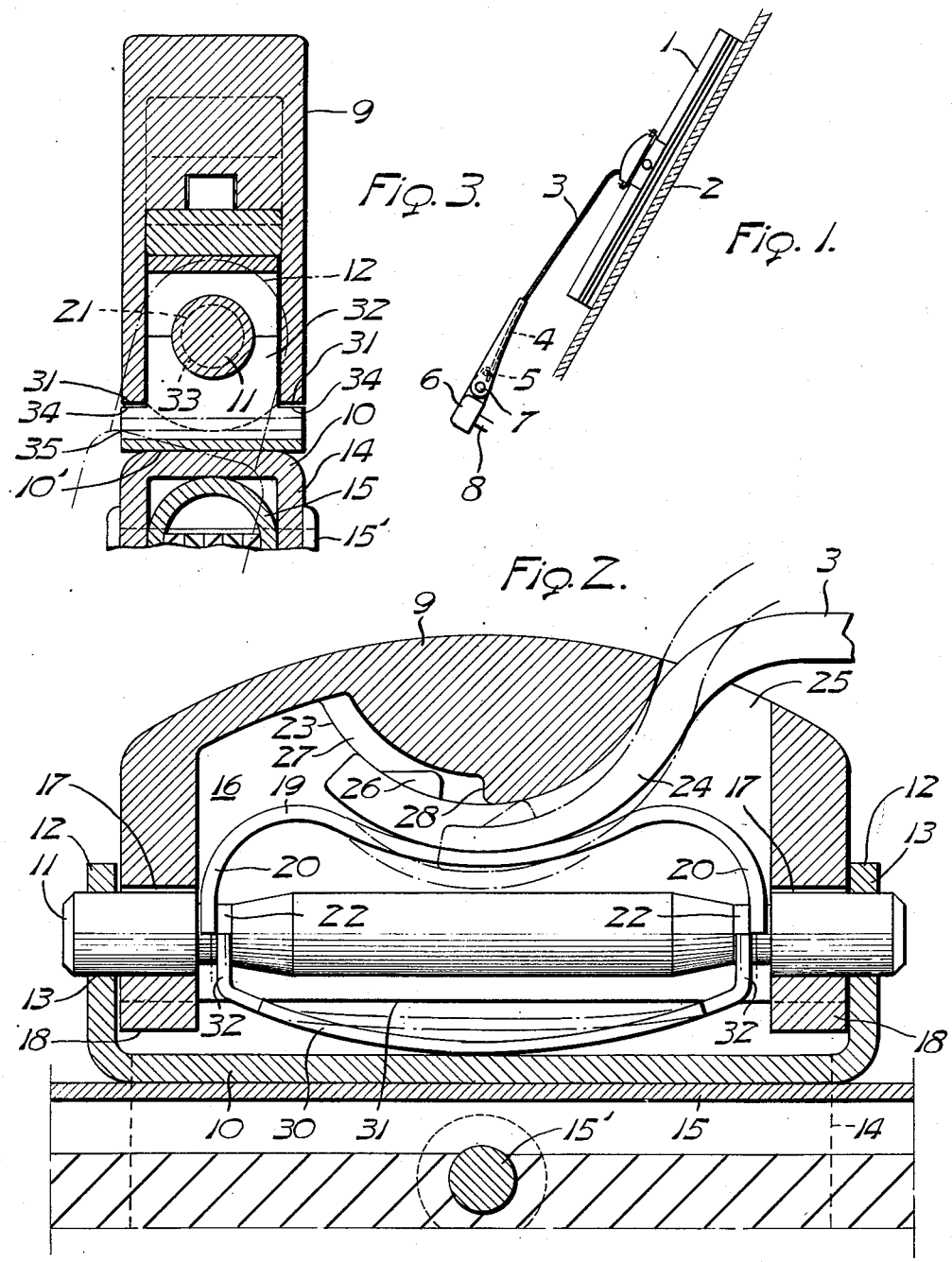

2,620,505

UNITED STATES PATENT OFFICE 2,620,505

WINDSHIELD WIPER BLADE CONNECTOR

Anton Rappl, Eggertsville, N. Y., assignor to Trico Products Corporation, Buffalo, N. Y.

Application September 4, 1946, Serial No. 694,806

8 Claims. (Cl. 15—250)

This invention relates to a windshield cleaner and particularly to an improved means for attaching the wiper to its actuating arm, this invention being an improvement on copending application Serial No. 655,637 filed March 19, 1946, by Robert B. Macpherson.

In the prior disclosure, the wiper mounting embodies an arm engaging clip or element which is pivotally attached to the wiping element by means of a pintle to provide a connection permitting of the wiping element assuming a dragging or rearwardly inclined position when moved back and forth across the windshield surface.

The object of the present invention is to incorporate in the wiper mounting novel means for causing the wiper to assume a substantially erect position upon the windshield surface when the wiper is at rest.

The invention further has for its object to provide an improved wiper mounting which is practical in design and economical in production.

Other objects will appear as the following description progresses, reference being had to the accompanying drawing, wherein:

Fig. 1 is a diagrammatic illustration of the improved wiper operatively supported on a windshield;

Fig. 2 is an enlarged sectional view through the clip and a portion of the blade, with the pivot pin, spring, and arm elements left in elevation; and Fig. 3 is a transverse sectional view of the mounting clip with portions broken away.

Referring more particularly to the drawing, the numeral 1 designates a wiper blade movable back and forth upon the windshield glass 2 by an actuating arm having an outer section 3 urged toward the windshield by a spring 4 which finds support on a part 5 on the inner section 6, the two arm sections being pivotally connected by a pin 7. The arm is fixed to a drive shaft 8 for being oscillated thereby.

The outer end of the arm is attached to the wiper by an articulated clip means comprising an arm engaged section 9 and a blade carried section 10 pivotally joined by a pintle or pin 11, the section 10 having opposed ears 12 apertured to form bearings 13 for receiving the protruding ends of the pin. The part 10 is also formed with depending flanges 14 which straddle the channeled holder 15 of the wiper blade and are secured to the latter by a suitable rivet or other fastener 15'. It therefore becomes apparent that the clip section 10 may be formed with the channeled holder in a one piece unit, and the ears 12 struck out of the back wall of the wiping blade.

The arm engaged section 9 is hollowed to form a chamber 16 through which the pin 11 extends lengthwise thereof, such pin passing through openings 17 in the end walls or ears 18 of the chamber to engage in the bearings 13. The chamber 16 receives a flat spring or leaf 19 which extends lengthwise of the pin and has terminal portions 20 resting upon the pin for support thereby. The terminal portions may be formed with arcuate seats 21 to receive the reduced portions 22 of the pin adjacent the end walls 18. By this arrangement the spring serves to lock the pin against accidental displacement from the registering apertures 13 and 17, and thereby maintains the pivotal connection operative at all times. The reduced pin portions 22 provide in effect notches in which the spring terminals 20 engage as keepers to lock the pivot pin in place. Any displacing movement of the pin axially thereof will be resisted by the forward one of the terminal portions 20 abutting against the adjacent end wall 18.

The body portion of the spring intermediate the terminals 20 yieldably rests against the raised convex wall 23 which, as shown in Fig. 2, overlies the spring. Such intermediate body portion will be depressed by the terminal tongue 24 of the arm section 3 when introduced through an entranceway 25 into the chamber 16. The tongue 24 is preferably curved about a transverse axis, and the outer contour of the raised wall 23 is likewise shaped so as to nestingly fit within the curved tongue. In order to secure the blade against accidental displacement from the arm, the arm tongue 24 is formed with a lug 26 to play in a groove 27 formed in the raised wall 23, a keeper shoulder 28 at the inner end of the groove serving to prevent the tongue from being accidentally withdrawn from the chamber 16.

A normalizing spring is incorporated in the hinged joint between the clip sections and acts to urge the wiping blade toward an upright position on the windshield surface when in a parked position thereon. While this spring may be of any suitable form to accomplish the purpose, the spring herein shown is in the form of a flat bowed spring 30 and is interposed between the clip 9 and a flat surface 10' on the back of the blade, such as may be provided by the flat base of the blade carried part 10. Normally the face-contacting part of the spring has a flat face that rests squarely upon the flat surface 10' when the wiper is idle, which part is guidingly supported by the clip for receding movement to enable the wiper to rock from side to side when it is oscillated by its actuating arm 3. The bowed spring therefore reacts between the flat surface 10' on the blade and an opposing flat surface on the clip 9 as provided by the shoulders 31 at opposite sides of the chamber 16. The opposite terminals of the flat spring are reduced in width to form tongues 32 for having a sliding fit between the side walls of the chamber 16 and to engage in the notches 22 of the pintle where they have sufficient longitudinal play to enable the spring deforming when the blade swings from side to side. The tongues may be formed with arcuate seats 33 to conform to the reduced pintle portions with which they engage. The formation of the tongues provides shoulders 34 in opposition to the shoulders 31 for lateral support. This interlocking arrangement anchors the normalizing spring to the clip 9 against relative swinging movement therewith. Consequently, as the wiping blade swings about the axis of pintle 11 at the beginning of each wiping stroke, the flat surface 10' will shift laterally beneath the spring with a sidewise wiping engagement, as indicated at 35. This action deforms or flattens the bowed spring and provides an unbalanced condition which will tend to restore the blade to a normal position when at rest.

Furthermore, the tongues 32 will assist the terminal portions 20 in precluding unauthorized axial displacement of the pintle from its bearings 13 and 17. The parts are readily assembled and are so related as to interlock themselves together without the use of tools. Furthermore, the parts are compactly arranged and more or less housed within the chamber 16 against being tampered with as well as from the weather.

The foregoing description has been given in detail for ease of understanding and not by way of limitation since the inventive principles may be incorporated in other physical embodiments without departing from the spirit of the invention and the scope of the appended claims.

What is claimed is:

1. A wiper, an arm attaching clip having a chamber opening toward a transversely flat back face of the wiper, a pressure transmitting pintle passing through the chamber lengthwise of the wiper and pivotally connecting the latter to the clip for assuming a dragging position when moved back and forth over a windshield surface, and a spring device arranged in the chamber and having a transversely flat normalizing face yieldably bearing upon said back face to urge the wiper pivotally about the pintle axis to a position normal with respect to the windshield surface, said spring device being interposed between the pintle and the wiper and reacting to bring the flat back face of the wiper into full facial contact with the flat normalizing face of the device.

2. A wiper blade back having upstanding ears, an arm attaching clip interposed between the ears and formed therewith with registering openings, a pressure transmitting pintle passing through the registering openings to hingedly connect the wiper to the clip, said clip being hollow to expose the pintle between its opposite ends, and a normalizing spring interposed between the clip and the wiper back and acting thereon to urge the wiper about the pintle to a position normal to the windshield surface, said spring having a part interlocking with the exposed pintle to secure the latter against axial displacement from the bearings.

3. A windshield wiping blade having spaced ears on its back edge, a mounting clip having a part interposed between the ears, a pressure transmitting pintle carried by said part and journaled in said ears for hingedly connecting the blade to the clip for movement about a fixed axis, the back edge of the blade opposing said part having a transversely flat face, and a flat bowed spring carried by said clip part and exerting pressure on the flat face for urging the blade to a position normal with respect to the windshield surface while yielding to permit the blade to assume a rearwardly inclined dragging position with respect to an actuating arm.

4. A wiper, an arm attaching clip, pintle means pivotally connecting the two and having bearing support on the wiper for transmitting thereto the wiping pressure imposed by an actuating arm, said wiper swinging about a fixed axis extending through the pintle means and having a flat back face, said clip having a portion extending toward the back face, and a spring supported by such clip portion and having a flat face yieldably bearing upon the black face and cooperating therewith for urging the wiper to a position normal with respect to the windshield surface, both flat faces being flat transversely of the fixed axis.

5. A wiping blade, an arm attaching clip arranged over the back of the blade, a pivot supporting the blade for rocking laterally about a fixed axis longitudinal of the blade, the blade having a substantially flat transverse back face opposing the overlying clip, and a normalizing spring device interposed between the clip and the blade and having a part guidingly supported by the clip and provided with a flat face yieldably engaging the back face to permit the wiper to rock while normally acting to bring the blade to a position beneath the clip wherein the two flat faces fully engage.

6. A wiping blade element, an arm attaching clip element overlying the blade element and pivotally supporting the same for lateral rocking about a fixed axis, one element having a flat face extending transversely of the pivotal axis, and a spring pressed element having a part guidingly supported by the other element for yielding movement toward and from the flat face and itself having a flat face squarely seating thereon to yieldably hold the blade element normally related to the clip element while permitting the blade element to so rock.

7. A wiping blade element, an arm attaching clip element overlying the blade element and pivotally supporting the same for lateral rocking about a fixed axis, one element having a flat face extending transversely of the pivotal axis, and a spring device guidingly mounted on the other element for receding movement from the flat face against the spring urge to permit such rocking and itself having a cooperative flat face tending to squarely seat upon the first face to hold the blade element and clip element normally related.

8. A wiping blade element, an arm attaching clip element arranged thereover and pivotally connected thereto in a manner to enable the blade element to rock laterally beneath the clip element about a fixed axis, one element having a transversely flat face, and the other element having a spring pressed member with a flat face for normally seating squarely upon the first flat face to keep the blade element to assume a normal relation to the clip element while yielding to a counteracting blade-rocking force originating in the blade element, said spring pressed member being guidingly supported by said other element and constrained to pivot as a unit therewith relative to said one element.

ANTON RAPPL.

REFERENCES CITED

The following references are of record in the file of this patent:

UNITED STATES PATENTS

| Number | Name | Date |
|---|---|---|
| 1,703,181 | Tarver | Feb. 26, 1929 |
| 1,779,344 | Tarver | Oct. 21, 1930 |
| 1,971,893 | Anderson | Aug. 28, 1934 |
| 2,147,113 | Smulski | Feb. 14, 1939 |